United States Patent [19]

Gramckow

[11] Patent Number: 5,536,029
[45] Date of Patent: Jul. 16, 1996

[54] ROWING POWERED CYCLE

[76] Inventor: Jurgen Gramckow, 4096 Faria Rd., Ventura, Calif. 93001

[21] Appl. No.: 403,271

[22] Filed: Mar. 13, 1995

[51] Int. Cl.⁶ ........................................................ B62M 1/00
[52] U.S. Cl. .......................... 280/263; 280/234; 280/244; 280/253
[58] Field of Search .................................. 280/224, 225, 280/232, 234, 240, 242.1, 244, 248, 252, 253, 255, 263, 267, 282, 288.1

[56] References Cited

U.S. PATENT DOCUMENTS

| | | |
|---|---|---|
| 224,415 | 2/1880 | French . |
| 369,860 | 9/1887 | Kempster . |
| 813,741 | 2/1906 | Rudbeck . |
| 1,845,044 | 2/1932 | Curry . |
| 3,226,130 | 12/1965 | Smith . |
| 4,126,329 | 11/1978 | Tchernyak . |
| 4,541,647 | 9/1985 | Braun ........................................ 280/234 |
| 4,632,414 | 12/1986 | Ellefson . |
| 4,700,972 | 10/1987 | Salmon . |
| 4,705,284 | 11/1987 | Stout ..................................... 280/282 X |
| 4,749,207 | 6/1988 | Oh . |
| 4,796,907 | 1/1989 | Geller . |
| 4,886,289 | 12/1989 | Krause, II et al. . |
| 4,941,673 | 7/1990 | Bennett . |

Primary Examiner—Eric D. Culbreth
Assistant Examiner—Victor E. Johnson
Attorney, Agent, or Firm—Kelly Bauersfeld & Lowry

[57] ABSTRACT

A rowing powered cycle is provided with a pair of rowing arms movable through a fore-aft reciprocal stroke motion and coupled to a drive mechanism for driving the cycle. The rowing arms are additionally coupled to a steering linkage for steering the cycle in response to left or right tilting movement of the rowing arms. Cycle steering may be performed simultaneously with reciprocal stroking motion of the rowing arms to drive the cycle, or during coasting movement.

17 Claims, 4 Drawing Sheets

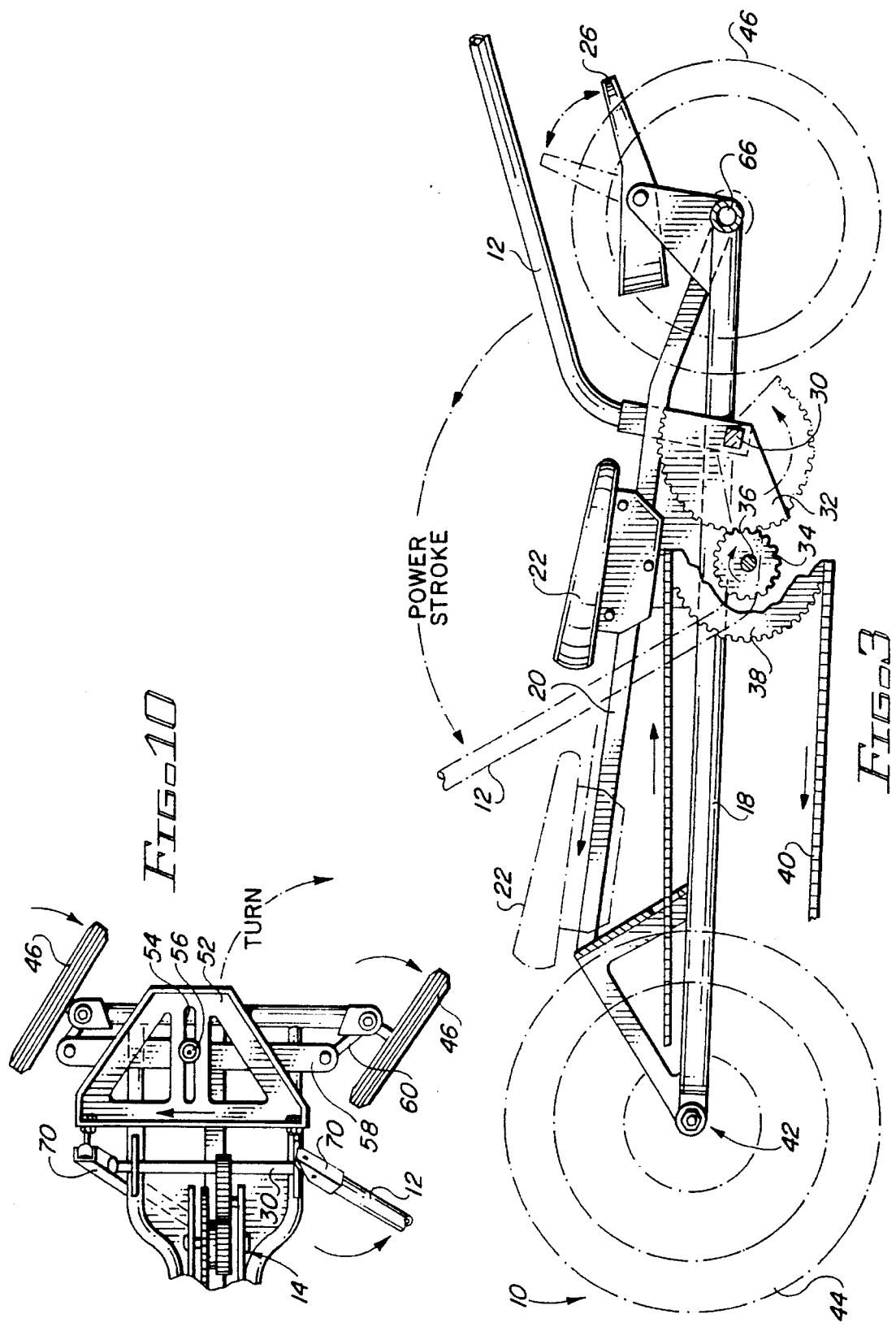

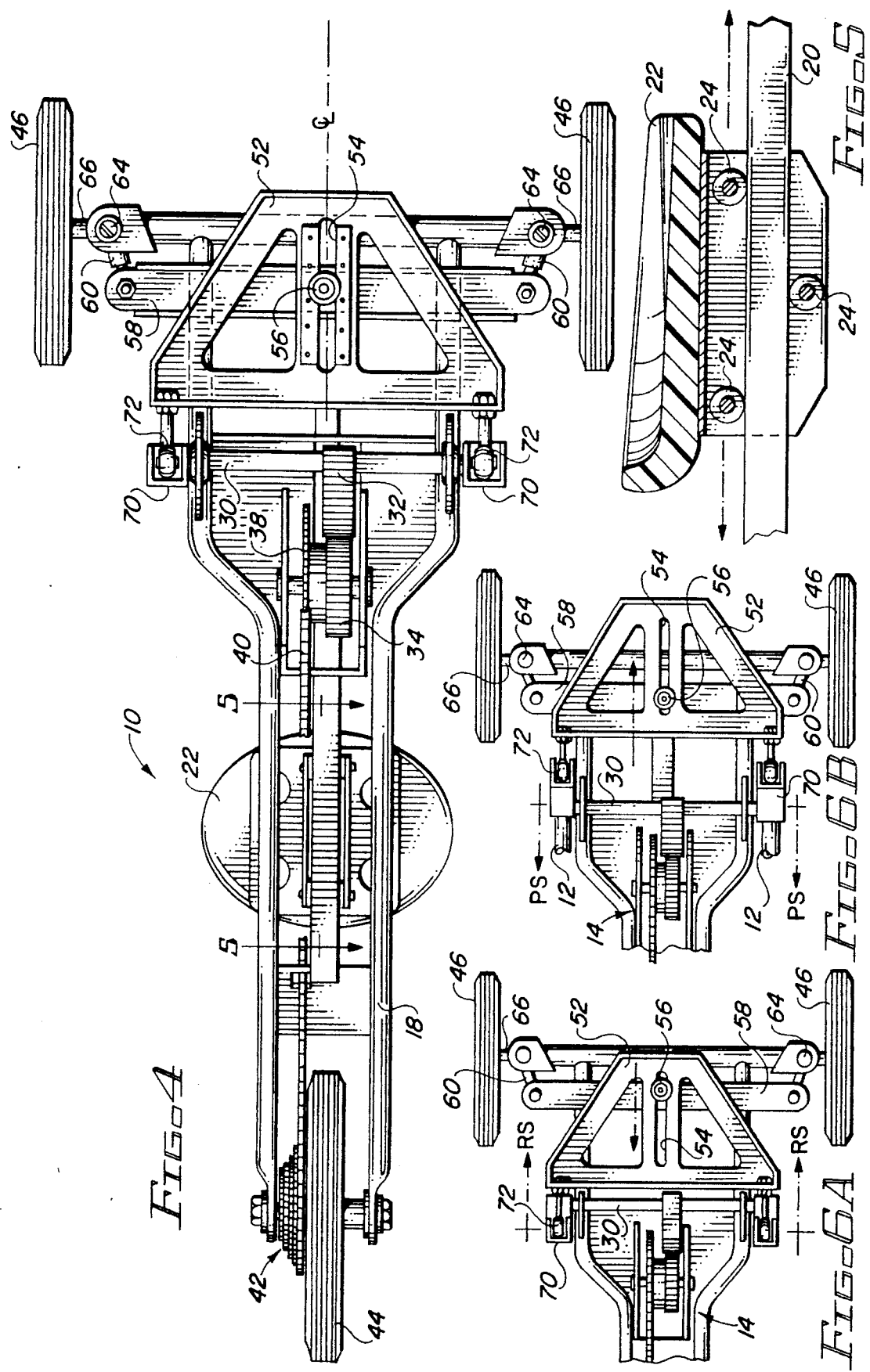

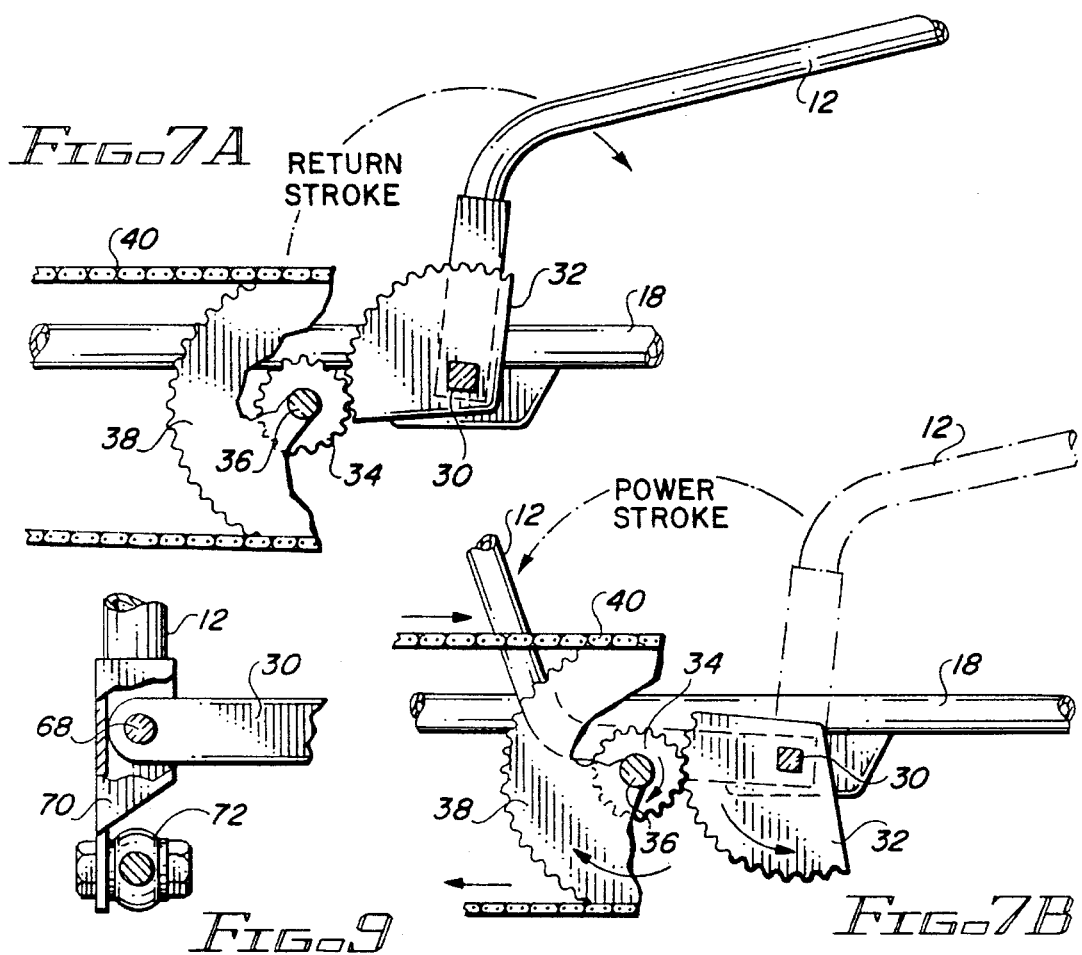
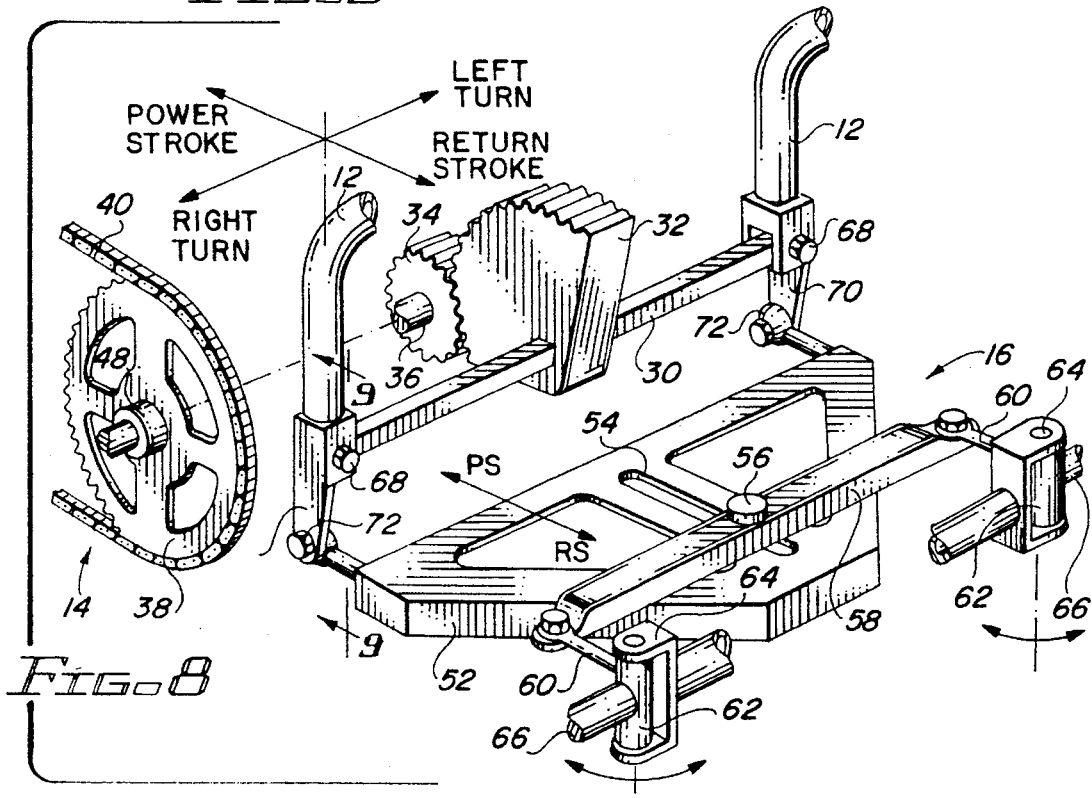

ROWING POWERED CYCLE

BACKGROUND OF THE INVENTION

This invention relates generally to a multiwheeled cycle adapted for propulsion in response to a rowing action. More particularly, this invention relates to an improved rowing powered cycle wherein the cycle is steered in an intuitive manner by appropriate left or right tilting motion of at least one rowing arm in the direction of a desired turn.

Rowing powered cycles are generally known in the art and typically comprise a lightweight vehicle frame supported on multiple wheels for rolling movement. At least one rowing arm or bar is mounted on the frame for reciprocal fore-aft displacement with a rowing action, wherein the rowing arm is manipulated by a vehicle rider seated in a forward-facing position on a vehicle seat. A drive mechanism is coupled between the rowing arm and one or more cycle wheels for driving the cycle in a forward direction. In a typical configuration, the cycle is propelled in a forward direction when the rowing arm is pulled rearwardly by the cycle rider, and the drive mechanism free-wheels when the rowing arm is moved through a return stroke in a forward direction.

Rowing powered cycles of the general type described above have included a variety of different mechanisms for vehicle steering. On one common form, the steering mechanism is manipulated by foot pedals engaged with the rider's feet. In another common form, the rowing arm or arms include a rotatable handlebar which can be turned in a manner similar to a conventional bicycle or tricycle to steer the cycle. Other steering concepts have envisioned mounting of the rider's seat onto tiltable frame components so that the vehicle can be steered by mere shifting of the rider's weight. None of these prior steering mechanisms has been entirely satisfactory in a rowing powered cycle for various reasons, primarily including a failure to provide accurately controlled steering to accomplish relatively short radius turning maneuvers with safety and precision, and in a manner which is both intuitive and ergonomically comfortable for the vehicle rider.

The present invention provides an improved rowing powered cycle adapted for forward propulsion by means of a rowing action, wherein precision steering is obtained in an improved and intuitively obvious manner by simple tilting of one or more rowing arms in the desired direction of a vehicle turn.

BACKGROUND OF THE INVENTION

In accordance with the invention, an improved rowing powered cycle includes one or more rowing arms for propelling the cycle in a forward direction in response to a reciprocal fore-aft stroke motion. The rowing arm or arms are connected to a drive mechanism coupled in turn to at least one drive wheel for propelling the cycle in a forward direction. The rowing arm or arms are additionally connected by a steering linkage for appropriately turning one or more steering wheels in the direction of a desired turn, in response to lateral tilting motion of the rowing arms. The drive mechanism and the steering linkage may be operated simultaneously so that forward driving motion can be continued while cycle is maneuvered through a turn.

In one preferred form of the invention, the cycle comprises a relatively lightweight frame supported on at least one steerable front wheel and at least one power-driven rear wheel. A tricycle configuration with dual front wheels is preferred, although a four wheel configuration with dual rear drive wheels may be employed. A pair of rowing arms project upwardly from the opposite ends of a transversely mounted drive shaft which carries a segment gear for rotatably driving a pinion gear and drive sprocket of the drive mechanism. The drive sprocket is coupled in turn by a chain or the like to a driven hub associated with the rear drive wheel. Either the drive sprocket or the driven hub includes a one-way clutch for unidirectional rotational driving thereof. Accordingly, pivoting motion of the rowing arms in one direction operates the drive mechanism to forwardly propel the vehicle, whereas return stroke motion of the rowing arms results in free-wheeling of the one-way clutch without vehicle driving. Accordingly, back-and-forth reciprocal motion of the rowing arms represents a sequence of power strokes and return strokes similar to a common rowing action.

The rowing arms are connected to the drive shaft by pivot pins which accommodate lateral tilting motion of the rowing arms relative to the cycle frame. In this regard, in the preferred form, the rowing arms include steering segments which project downwardly beyond the drive shaft and are coupled to the steering linkage. In the preferred form, these steering segments are connected by universal joints to a slide plate having a longitudinally extending steering slot for receiving a slide pin carried on the tie rod of a standard steering mechanism. Reciprocal fore-aft motion of the rowing arms thus displaces the slide plate in a fore-aft direction without lateral shifting of the tie rod. However, tilting motion of the rowing arms in a lateral direction, to the left or to the right, similarly shifts the slide plate in an opposite lateral direction to carry the tie rod laterally for steering purposes. As a result, the tie rod shifts the directional angle of the steering wheel or wheels in the direction and with a magnitude corresponding to the lateral displacement of the rowing arms. Alternative steering mechanisms connected between the rowing arms and the tie rod may be employed.

With this construction, steering of the cycle to maneuver through a turn can be accomplished easily and intuitively by merely tilting the rowing arms in the direction of the desired turn. A turning movement can be performed while continuing to drive the cycle with reciprocal stroke motion of the rowing arms. Alternately, a turning movement can be performed while coasting, without reciprocal stroke movement of the rowing arms.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a fragmented right side elevation view of the cycle, with portions broken away to illustrate the construction and operation of a cycle drive mechanism;

FIG. 4 is a bottom plan view of the cycle;

FIG. 5 is an enlarged fragmented vertical sectional view taken generally on the line 5—5 of FIG. 4;

FIG. 6a is a fragmented bottom plan view similar to a portion of FIG. 4, and illustrating a steering linkage in one operational position;

FIG. 6b is a fragmented bottom plan view similar to FIG. 6a, and illustrating an alternative operational position of the steering linkage;

FIG. 7a is an enlarged fragmented sectional view illustrating a portion of the cycle drive mechanism in an operational position corresponding to FIG. 6a;

FIG. 7b is a fragmented elevational view illustrating a portion of the cycle drive mechanism in an operational position corresponding with FIG. 6b;

FIG. 8 is a fragmented and partially exploded perspective view illustrating portions of the cycle drive mechanism and steering linkage;

FIG. 9 is an enlarged fragmented vertical sectional view taken generally on the line 9—9 of FIG. 8; and FIG. 10 is fragmented bottom plan view similar to FIGS. 6a and 6b, and depicting manipulation of the rowing arms to steer the cycle.

DETAILED DESCRIPTION OF THE PREFERRED EMBODIMENTS

Figure 1:
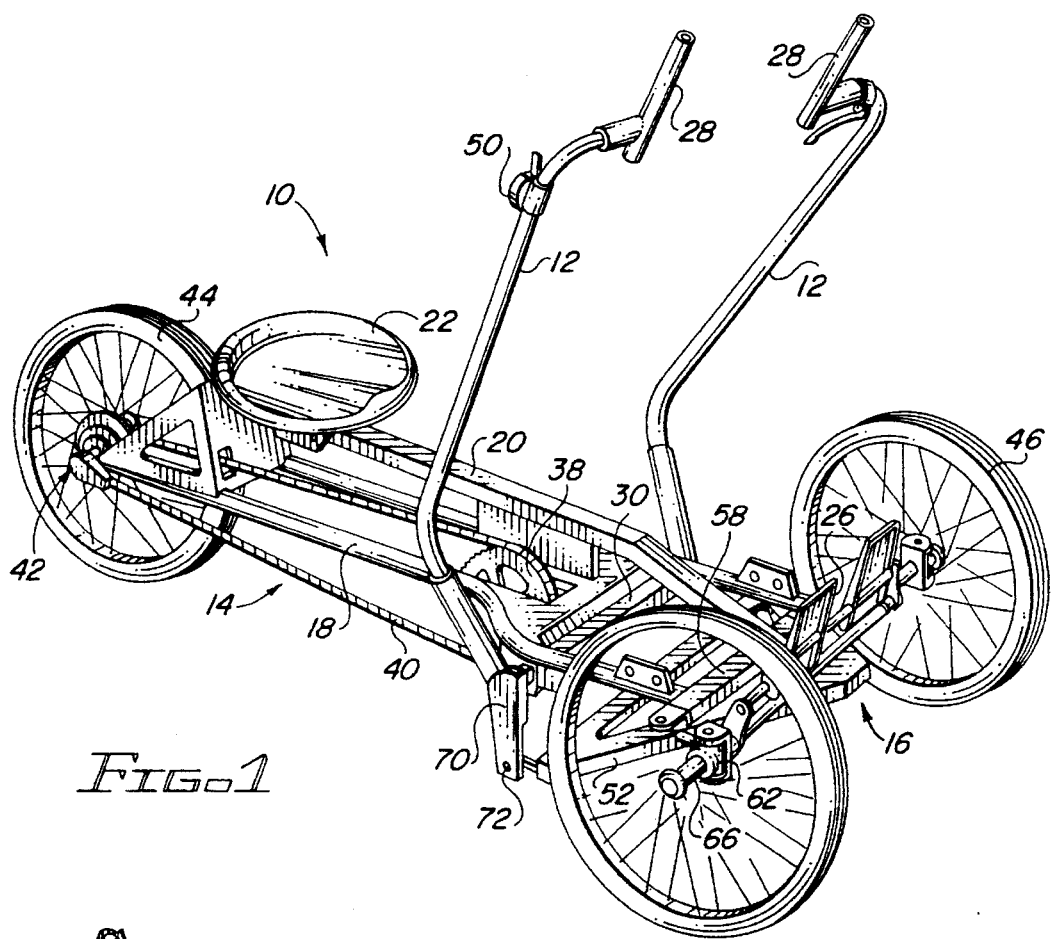
FIG. 1 is a perspective view illustrating features of the invention; a rowing powered tricycle embodying the novel
Figure 2:
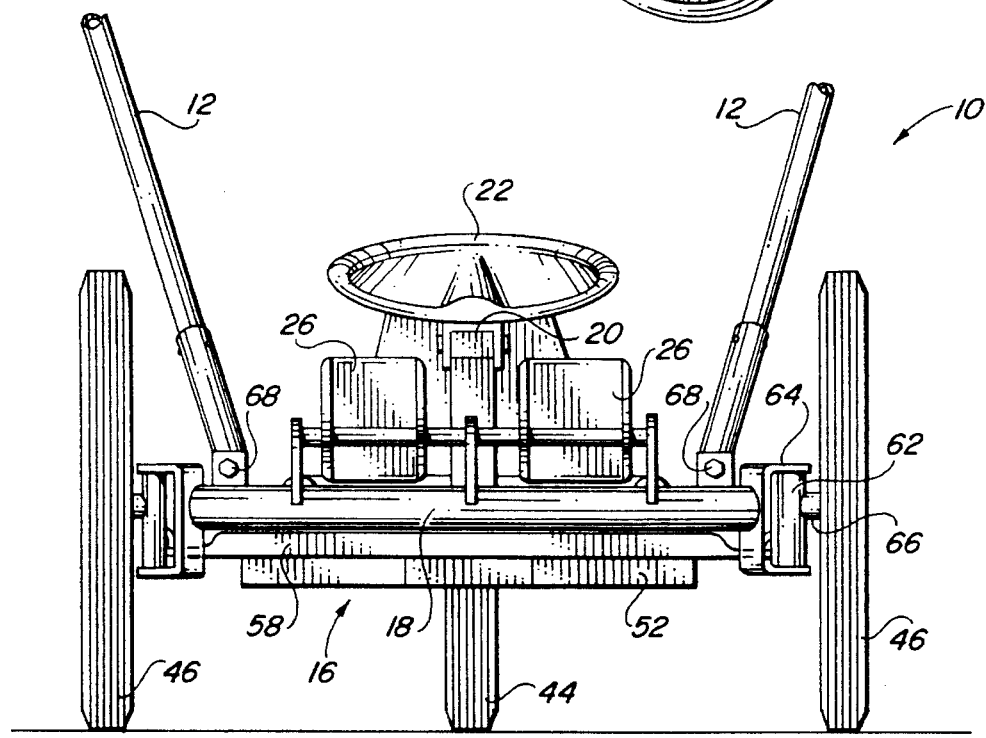
FIG. 2 is a front elevation view of the cycle shown in FIG. 1.

As shown in the exemplary drawings, a rowing powered cycle is referred to generally in FIGS. 1–4 by the reference numeral 10. The cycle 10 includes a pair of upstanding rowing arms 12 adapted for reciprocal rowing-type movement in a fore-aft direction to propel the cycle in a forward direction by means of a drive mechanism 14. The rowing arms 12 are additionally adapted for lateral tilting to the left or to the right to operate a steering linkage 16 for controlled cycle steering. The cycle 10 is thus propelled and steered by a rider (not shown) through the use of the rider's arms only, wherein vehicle steering may be performed concurrently with forward driving of the cycle or during forward coasting motion.

The rowing powered cycle 10 of the present invention is designed for forward manual propulsion by means of a conventional rowing action, wherein the rowing arms 12 are manipulated by a vehicle rider in a reciprocal fore-aft direction through alternate power-drive and return strokes. The cycle 10 may thus be used as an exercise apparatus for accomplishing a vigorous workout of various muscle groups, as is generally known with respect to rowing-type maneuvers.

In this regard, the cycle 10 is shown in the illustrative drawings to include a relatively lightweight frame 18 which includes a longitudinally extending upper seat bar 20 with a rider's seat 22 mounted thereon. The rider's seat 22 is connected to the seat bar 20 by appropriate rolling bearings 24 ( FIG. 5) which accommodate longitudinal fore- aft displacement of the seat 22 as the rowing arms 12 are moved through the reciprocal stroking action. In this regard, the vehicle rider normally sits on the seat 22 with the rider's feet rested upon pivotally mounted foot pedals 26 at the front of the frame 18, while grasping a pair of handles 28 (FIG. 1) mounted respectively at the upper ends of the two rowing arms 12. The movable rider's seat 22 and pivotal foot pedals 26 permit the rider to shift longitudinally in a fore-aft direction, as depicted in solid and dotted lines respectively in FIG. 3, while the rowing arms 12 are moved back-and-forth. Alternatively, the rider's seat 22 and foot pedals 26 may be mounted in fixed positions on the frame 18 when the cycle 10 is adapted for use by a rider such as a paraplegic having limited or no use of the leg muscles.

In accordance with a primary aspect of the invention, the rowing arms 12 are manipulated by the vehicle rider to perform the dual functions of cycle propulsion as well as cycle steering. Such cycle steering is accomplished with variable turning ratio precision and in an intuitive manner by simple lateral tilting of the rowing arms 12 in the direction of a desired turn. That is, when the rowing arms 12 are held by the rider in a generally and mutually upright orientation (FIGS. 1 and 2), one or more steerable wheels are positioned by the steering linkage 16 for cycle movement in a forward direction. Cycle turning to the left or to the right is accomplished by simple lateral tilting of the rowing arms 12 (FIG. 10), with the magnitude of lateral tilt being directly proportional to the sharpness of the resultant turning maneuver. Cycle steering in this manner can be accomplished concurrently with fore-aft rowing arm movement for forward propulsion, or without such fore-aft rowing arm movement, i.e., during cycle coasting.

With reference to the accompanying drawings, the cycle drive mechanism 14 comprises a transversely extending rotatable drive shaft 30 mounted on the cycle frame 18 with its opposite ends connected respectively to the rowing arms 12. The drive shaft 30 carries a segment gear 32 shown best in FIGS. 7 and 8, wherein the segment gear 32 is meshed with a smaller driven gear 34. The driven gear 34 is rotatably carried on the cycle frame 18 by means of a coupler shaft 36 which also carries a relatively large diameter drive sprocket 38. The drive sprocket 38 carries a drive chain 40 for transmitting rotational motion thereof to a driven hub unit 42 which supports a drive wheel 44 at the rear of the cycle frame 18. In this regard, while the illustrative drawings show the cycle 10 in a tricycle geometry with a single rear drive wheel 44, and a pair of front steering wheels 46, it will be understood that other cycle geometries may be used, such as a four wheel geometry with two rear wheels 44.

In a preferred cycle configuration, the drive sprocket 38 of the drive mechanism 14 is supported on the coupler shaft 36 by means of a free-wheel hub 48 (FIG. 8) adapted for limiting the sprocket 38 to unidirectional rotational motion. With this construction, as the rowing arms 12 are pulled rearwardly through a typical power stroke (FIG. 76), typically on the order of about 90 to 105°, the segment gear 32 engages the drive gear 34 and operates through the hub 48 to rotatably drive the sprocket 38. Such rotational motion is transmitted by the drive chain 40 to the rear hub unit 42, to result in forward rotational driving of the rear drive wheel 44. Subsequent return stroke movement of the rowing arms 12, as illustrated in FIG. 7a, displaces the segment gear 32 in the opposite direction for oppositely driving the driven gear 34, but the sprocket 38 is not rotationally driven thereby as a result of the free-wheeling action of the free-wheel hub 48. Accordingly, as the rowing arms 12 are repeatedly moved through the power and return strokes, the drive sprocket 38 is driven only during the power stroke.

It should be noted that the drive sprocket 38 continues to rotate in the forward-drive direction when the rowing arms 12 are moved through a return stroke, since the sprocket 38 is rotationally driven by the chain 40 as a result of continued forward rotational movement of the rear drive wheel 44. That is, the cycle 10 effectively coasts in a forward direction during rowing arm return stroke, with the forward rolling movement of the drive wheel 44 causing the chain 40 to continue movement during the return stroke. Such continued chain movement is advantageous since it facilitates drive ratio or gear shifting of a conventional derailleur mechanism which may be employed as part of the rear hub unit 42, for gear shifting by means of a lever 50 (FIG. 1) or the like mounted on one of the rowing arms 12.

In an alternative drive arrangement, the drive sprocket 38 may be connected directly to the coupler shaft 36 for back-and-forth rotational movement in response to rowing arm reciprocation. In this geometry, the driven hub unit 42 at the rear drive wheel 44 is constructed to include a one-way clutch or free-wheel feature so that the drive wheel 44 is powered only in a forward-drive direction. The drive chain 40 would thus shift back-and-forth during rowing arm reciprocation, with this on-going drive chain motion also facilitating gear ratio shifting at any time during fore-aft movement of the rowing arms.

The steering linkage 16 generally comprises a slide plate 52 (FIGS. 4, 6, 8 and 10) mounted on the frame 18 for fore-aft reciprocal movement along with the rowing arms 12 during displacement of the rowing arms to drive the vehicle. The slide plate 52 has a central longitudinal slot 54 formed therein for receiving a steering pin 56 mounted on a laterally extending tie rod 58. The tie rod 58 in turn has its opposite ends pivotally connected to a pair of crank links 60 for rotatably moving a pair of bushings 62 relative to the vertical axes of a pair of spindle pins 64. The rotatable bushings 62 in turn include axle members 66 (FIG. 8) for rotatably supporting the two front steering wheels 46.

The front steering wheels 46 are turned left or right by lateral shifting of the tie rod 58. This lateral shifting is achieved by a corresponding lateral shifting of the steering slide plate 52. As previously described, lateral tilting of the two rowing arms 12 provides this important steering function.

More specifically, as shown best in FIGS. 8 and 9, the two rowing arms 12 are connected to the opposite ends of the drive shaft 30 by pivot pins 68 which extend in a fore-aft direction relative to the vehicle frame 18. Accordingly, the rowing arms 12 can be laterally tilted with respect to the frame 18, without requiring interruption of the fore-aft power drive motion. The rowing arms 12 include steering extensions 70 which project downwardly beyond the drive shaft 30 and are connected by universal joints 72 or the like to the opposite rear corners of the steering slide plate 52. Accordingly, lateral shifting motion of the rowing arms 12 to the left or the right causes the slide plate 52 to be laterally shifted in an opposite direction to achieve a corresponding lateral shift of the tie rod 58. Such lateral movement of the tie rod 58 displaces the two crank links 60 for turning the front wheels 46 in the same direction as the lateral shift or tilt applied to the rowing arms 12 (FIG. 10). The steering wheels 46 are thus turned, with the magnitude of the turn being directly proportional to the magnitude of lateral shifting displacement of the rowing arms 12.

This turning action is accomplished quickly and easily, and in a manner which is highly intuitive to and ergonomically comfortable for the vehicle rider. That is, the vehicle is steered easily and with precision in a virtually instinctive manner, such that very little training or practice is required to operate the cycle 10. Turning maneuvers can be accomplished quickly and easily while continuing to power-drive the vehicle by reciprocal stroking action of the rowing arms 12. Alternately, turning action can be accomplished without reciprocal motion of the rowing arm 12, such as when the vehicle is coasting in a forward direction.

A wide variety of alternative steering linkage configurations can be used for connecting tilt motion of the rowing arms 12 to a tie rod 58 used to steer the front wheels.

A variety of further modifications and improvements to the rowing powered cycle 10 of the present invention will be apparent to those skilled in the art. Accordingly, no limitation on the invention is intended by way of the foregoing description and accompanying drawings, except as set forth in the appended claims.

What is claimed is:

1. A rowing powered cycle, comprising:
   a frame supported by a plurality of wheels for rolling movement:
      at least one rowing arm mounted on said frame for reciprocal stroke motion in a generally fore-aft direction;
      a drive mechanism on said frame and coupled between said at least one rowing arm and at least one of said wheels for driving the cycle in response to reciprocal stroke motion of said rowing arm; and
      a steering linkage mounted on said frame and coupled to at least one of said wheels for steering the cycle;
      said at least one rowing arm being mounted on said frame to permit lateral tilting thereof relative to said frame, said steering linkage including a reciprocal member movable in a generally fore-aft direction in response to reciprocal stroke motion of said at least one rowing arm and being laterally movable in response to lateral tilting of said rowing arm, and a steering member movable laterally with said steering linkage and engaged with said reciprocal member to shift said steering linkage laterally in response to lateral motion of said reciprocal member for steering the cycle, and to permit fore-aft reciprocal sliding motion between said reciprocal and steering members without laterally shifting said steering linkage.

2. The rowing powered cycle of claim 1 further including a rider's seat mounted on said frame.

3. The rowing powered cycle of claim 1 wherein said at least one rowing arm is mounted on said frame in a generally upstanding orientation for fore-aft reciprocal stroke motion to drive the cycle and for left and right lateral tilting motion in the direction of a desired turn to steer the cycle, wherein the sharpness of the desired turn is directly proportional to the magnitude of said lateral tilting motion.

4. The rowing powered cycle of claim 1 wherein said at least one rowing arm is mounted on said frame to permit lateral tilting thereof for cycle steering simultaneously with fore-aft reciprocal stroke motion thereof for cycle driving.

5. The rowing powered cycle of claim 1 wherein said reciprocal member comprises a slide plate having a longitudinally extending slot formed therein and extending generally in a fore-aft direction, and wherein said steering member comprises a steering pin slidably received in said slide plate slot, and said steering linkage further including means coupled between said steering pin and at least one of said wheels for steering the cycle in response to lateral shifting motion of said steering pin, said at least one rowing arm being connected to said slide plate for laterally shifting said slide plate in response to lateral tilting of said rowing arm.

6. The rowing powered cycle of claim 5 wherein said means coupled between said steering pin and at least one of said wheels for steering comprises a tie rod linkage.

7. The rowing powered cycle of claim 1 wherein said drive mechanism comprises a transversely extending drive shaft rotatably mounted on said frame, and gear drive means coupled between said drive shaft and at least one of said wheels for driving said wheel in response to rotation of said drive shaft in one direction and for free-wheeling in response to rotation of said drive shaft in an opposite direction, said at least one rowing arm being connected to said drive shaft for rotating said drive shaft back and forth in opposite directions in response to reciprocal stroke motion of said rowing arm, said rowing arm being connected to said drive shaft by a pivot pin to permit lateral tilt motion of said rowing arm.

8. The rowing powered cycle of claim 7 wherein said at least one rowing arm includes a steering extension projecting downwardly beyond said drive shaft, said steering extension being connected to said reciprocal member.

9. The rowing powered cycle of claim 7 wherein said gear drive means comprises a sprocket rotatably driven in one direction in response to reciprocal stroke motion of said rowing arm, a variable speed ratio driven hub unit on one of said wheels, a drive chain coupled between said sprocket and said driven hub unit to drive the cycle, and one-way clutch means to permit cycle coasting during rowing arm stroke motion in an opposite direction.

10. The rowing powered cycle of claim 1 wherein said drive mechanism comprises one-way clutch drive means coupled between said at least one rowing arm and at least one of said wheels for driving the cycle in response to stroke motion of said rowing arm in one direction, and for free-wheeling to permit cycle coasting during rowing arm stroke motion in an opposite direction.

11. The rowing powered cycle of claim 2 wherein said seat is mounted on said frame for fore-aft sliding motion.

12. The rowing powered cycle of claim 11 further including foot pedal means on said frame.

13. A rowing powered cycle, comprising;

a frame supported by a plurality of wheels for rolling movement;

a rider's seat on said frame;

a pair of rowing arms mounted on said frame generally at opposite sides thereof in upstanding positions disposed in front of said seat, said rowing arms being mounted for reciprocal stroke motion together in a generally fore-aft direction;

a drive mechanism on said frame and coupled between said rowing arms and at least one of said wheels for driving the cycle in response to reciprocal stroke motion of said rowing arms; and a steering linkage mounted on said frame and including a laterally shiftable steering member coupled to one of said wheels for steering the cycle;

said rowing arms being mounted on said frame to permit lateral tilting thereof together relative to said frame, said steering linkage further including a reciprocal member movable in a generally fore-aft direction in response to reciprocal stroke motion of said rowing arms and being laterally movable in response to lateral tilting of said rowing arms, said steering member being engaged with said reciprocal member to shift said steering member laterally steering the cycle in response to lateral tilting of said rowing arms, and to permit fore-aft reciprocal sliding motion between said reciprocal and steering members without laterally shifting said steering linkage.

14. The rowing powered cycle of claim 13 wherein said steering linkage and said drive mechanism are coupled respectively to different wheels of said plurality of wheels.

15. The rowing powered cycle of claim 13 wherein said rowing arms are mounted on said frame to permit lateral tilting thereof for cycle steering simultaneously with fore-aft reciprocal stroke motion thereof for cycle driving.

16. The rowing powered cycle of claim 13 wherein said drive mechanism includes one-way clutch drive means for driving the cycle in response to reciprocal stroke motion of said rowing arms in one direction, and for free-wheeling to permit cycle coasting during motion of said rowing arms in an opposite direction.

17. The rowing powered cycle of claim 13 wherein said plurality of wheels comprises at least one rear wheel coupled to said drive mechanism and a pair of steerable front wheels coupled to said steering linkage.

\* \* \* \* \*